United States Patent [19]

Argurio et al.

[11] 3,932,563

[45] Jan. 13, 1976

[54] SELF-SEALING FILMS

[75] Inventors: Frederico Argurio, Brussels; Mario Borsatti, Overijse; William James Busby, Tervueren, all of Belgium

[73] Assignee: Exxon Research and Engineering Company, Linden, N.J.

[22] Filed: Sept. 25, 1974

[21] Appl. No.: 509,228

[30] Foreign Application Priority Data
Oct. 1, 1973 United Kingdom............... 45690/73

[52] U.S. Cl. ............................. 260/897 B; 260/31.6
[51] Int. Cl.$^2$.......................................... C08L 23/08
[58] Field of Search............................ 260/897, 31.6

[56] References Cited
UNITED STATES PATENTS

| | | | |
|---|---|---|---|
| 3,488,306 | 1/1970 | Thormahlen................ | 260/897 B X |
| 3,558,762 | 1/1971 | Koehniein................... | 260/897 B X |

FOREIGN PATENTS OR APPLICATIONS

| | | | |
|---|---|---|---|
| 872,296 | 6/1971 | Canada............................ | 260/897 X |

Primary Examiner—Carman J. Seccuro
Attorney, Agent, or Firm—William T. Clarke

[57] ABSTRACT

Compositions suitable for fabricating into a self-sealing film comprise (i) 90–99.95 wt.% of a copolymer of ethylene and a vinyl (or hydrocarbyl substituted vinyl) ester of a $C_1$–$C_{30}$ monocarboxylic acid, (ii) either 0.05 to 10 wt.% of a hydrocarbon resin, or 0.05 to 5 wt.% of polybutylene or polyisobutylene, or a combination of 0.05 to 10 wt.% of the hydrocarbon resin and 0.05 to 5 wt.% of polybutylene or polyisobutylene, provided the combined weight of the hydrocarbon resin and polybutylene or polyisobutylene is not more than 10 wt.% and (iii) 0.01 to 3.0% by weight based on the combined weight of (i) and (ii) of a partial carboxylic acid ester of a polyol, e.g. sorbitan monolaurate.

21 Claims, No Drawings

SELF-SEALING FILMS

This invention relates to self-sealing packaging films.

Self-sealing packaging films are known and are used in shops for example, for wrapping and display of food in refrigerated display units.

Various materials have been used for such films, the most common being PVC and polyolefin. However these films suffer from various disadvantages and have not been completely satisfactory in use.

We have now discovered a composition which when made into film has good antifog, roll wind-off and plate out properties. According to this invention a composition suitable for fabricating into a self-sealing film comprises (i) 90–99.95 wt.% of a copolymer of ethylene and a vinyl (or hydrocarbyl substituted vinyl) ester of $C_1$–$C_{30}$ monocarboxylic acid, (ii) either 0.05 to 10 wt.% of a hydrocarbon resin, or 0.05 to 5 wt.% of polybutylene or polyisobutylene, or a combination of 0.05 to 10 wt.% of the hydrocarbon resin and 0.05 to 5 wt.% of polybutylene or polyisobutylene, provided the combined weight of hydrocarbon resin and polybutylene or polyisobutylene is not more than 10 wt.%, and (iii) 0.01 to 3.0% by weight based on the combined weight of (i) and (ii) of a partial carboxylic acid ester of a polyol.

Concerning the ethylene copolymer the carboxylic acid is preferably aliphatic, and saturated and preferably monocarboxylic. Thus one may use vinyl propionate, vinyl hexoate, vinyl octoate, vinyl dodecanoate, vinyl behenate, or isopropenyl acetate. The particularly preferred ester is vinyl acetate. The resulting copolymer should preferably contain from 85–97 wt.%, e.g. 91 to 95 wt.% of ethylene.

One method of preparing the copolymers involves feeding the monomers into a tubular reactor which has been previously purged with nitrogen. A small amount of oxygen, usually 0.005 to 0.05 wt.% based on the weight of ethylene is also introduced into the reactor. Alternatively a peroxide initiator, e.g. di-t-butyl peroxide, or a mixture of peroxide initiator and oxygen may be introduced into the reactor in place of oxygen alone. A solvent (e.g. benzene, water, saturated hydrocarbons, methanol) may also be employed in the reaction. The pressure is maintained between 60 and 2700 atmospheres (900 and 40,000 p.s.i.g.), preferably between 135 and 2000 atmospheres (2,000 and 30,000 p.s.i.g.). The temperature should be maintained between 40°C and 300°C, preferably between 70°C and 250°C.

Another method of preparing the copolymers is via a batch process. Such a process requires a solvent for the reactants, the solvent being for example toluene or hexane. The preferred solvent however is benzene. The reaction initiator may be any peroxy compound, preferably di-t-butyl peroxide. The temperature of the polymerization reaction is dependent upon the particular peroxide initiator employed and should be high enough for sufficient decomposition of the initiator to occur. This temperature will usually be between 40°C and 300°C.

For the preferred initiator, i.e. di-tert-butyl peroxide, the most suitable temperature is between 130°C and 160°C. The pressure should be between 60 and 1000 atmospheres (900 and 15000 p.s.i.g.), and preferably being between 75 and 470 atmospheres (1100 and 7000 p.s.i.g.). The autoclave or similar equipment containing the solvent, initiator and vinyl or hydrocarbyl substituted vinyl ester is purged with nitrogen and then with ethylene before charging with a sufficient amount of ethylene to yield the desired pressure when heated to the reaction temperature. During the polymerization additional ethylene is added to maintain the pressure at the desired level. Further amounts of initiator and/or solvent, and/or vinyl and hydrocarbyl substituted vinyl ester may also be added during the reaction. On completion of the reaction free solvent and unreacted monomers are removed by stripping or some other suitable process yielding the desired polymer.

The ethylene copolymer should have a molecular weight corresponding to a melt index (as defined in DOR292) of 0.2 to 20, preferably 1.5–3.0.

The hydrocarbon resin may be a polyterpene resin or a resin obtained by the polymerization of a cracked petroleum distillate fraction. The polymer is preferably hydrogenated to yield a very light coloured product.

Although various petroleum distillate fractions may be used the preferred feed-stocks are those having a relatively wide boiling range, e.g. 20°C to 280°C.

Before polymerization takes place the cracked petroleum distillate fraction is preferably heat-soaked, e.g. at a temperature above 100°C e.g. 130°C to 140°C, for a period of less than one hour so as to dimerize the cyclic dienes. The heat-soaked feed is thereafter distilled and the desired fraction e.g. one boiling between 80°C and 180°C, vacuum distilled to obtain the desired cut to be polymerized.

The preferred fractions are those which comprise compounds having one or more unsaturated rings in the molecule, such as cyclodienes, cycloalkenes, indenes etc., in particular the fractions boiling above 100°C.

Polymerization preferably takes place without a catalyst, i.e. thermal polymerization at a preferred temperature of 240°C to 320°C, e.g. about 250°C. The thermal polymerization is preferably carried out in an inert atmosphere, e.g. $N_2$ at a pressure of 10–12 atmospheres for 1 to 9 hours. If desired polymerization can take place using a Friedel-Crafts catalyst, such as $AlCl_3$, $BF_3$, $SnCl_4$, $TiCl_4$ at a temperature of $-100°C$ to $+95°C$, e.g. 0°C to 55°C.

When the polymer is subjected to hydrogenation, the polymer is first preferably dissolved in a saturated hydrocarbon solvent such as heptane, in a proportion of, for example, 20 to 60% by weight in relation to the polymer solution.

Suitable hydrogenation catalysts include nickel, reduced nickel, nickel-tungsten sulphide, molydenum sulphide, and a preferred catalyst is a pre-activated catalyst on a Kieselguhr support containing about 58% by weight of nickel, the specific area being about 140 m²/g and the ratio:

$$\frac{\text{reduced nickel}}{\text{total nickel}}$$

being about 0.66. Suitable proportions of catalyst are from 5 to 20% by weight, e.g. 7 to 13% by weight, based on weight of resin.

Hydrogenation preferably takes place at 215° to 270°C e.g. about 215°C at a pressure of 40 to 60 atmospheres, e.g. 45 atmospheres, for a period up to 3 hours, e.g. about 2 hours.

After cooling the solution of polymer should be filtered to eliminate traces of catalyst and obtain a clear solution free from all impurities.

The solution is then distilled under nitrogen and thereafter steam distilled at a temperature not exceeding 260°C.

The resin thus obtained usually has a Gardner colour of 1 to 3, a bromine number of 1 to 20 and a ball-ring softening point of about 100°C.

A preferred resin derived from a petroleum distillate fraction is a hydrogenated polycyclopentadiene resin. Suitable hydrocarbon resins also include hydrogenated coumarone-indene resins.

Suitable polyisobutylenes (e.g. Vistanex) are highly paraffinic hydrocarbon polymeric compositions with long straight molecules having a terminal unsaturation only. They are relatively low molecular weight, very viscous, clear tacky and semi-solids.

The polyisobutylene which may be used is preferably of relatively low molecular weight, e.g. of Staudinger viscosity average molecular weight from 8,700 to 10,000 and a viscosity average MW (Flory) of 30,000 to 50,000 e.g. about 35,000. The polyisobutylene may be a homopolymer or may contain small amounts of other copolymerised monomers such as styrene.

The preferred proportions of ethylene copolymer and hydrocarbon resin or polybutylene or polyisobutylene are 96 to 99 wt.% of ethylene copolymer and 1 to 4 wt.% of hydrocarbon resin, polybutylene or polyisobutylene and 92 and 96 wt.% of ethylene copolymer and 3 to 6 wt.% of hydrocarbon resin plus 1 to 2 wt.% of polybutylene or polyisobutylene.

The partial carboxylic acid ester of a polyol is preferably derived from a (monobasic) fatty acid and preferably from a $C_{10}$-$C_{24}$ carboxylic acid e.g. a $C_{10}$-$C_{20}$ fatty acid. The carboxylic acid can be saturated or unsaturated. Examples of suitable acids are lauric, myristic, palmitic, stearic, behenic, oleic or erucic. Dicarboxylic acids such as adipic or pimelic acids could be used.

The polyol may have two hydroxyl groups per molecule, e.g. ethylene glycol, propylene glycol; three hydroxyl groups per molecule, e.g. glycerol or trimethylol propane or four hydroxyl groups per molecule, e.g. pentaerythritol. Further examples are sorbitol (6 hydroxyl groups), sorbitan (sorbital anhydride - 4 hydroxyl groups) and dipentaerythritol (6 hydroxyl groups).

Since the ester must be a partial ester at least one of the hydroxyl groups must be un-esterified, and usually only one of the hydroxyl groups is esterified. Preferred esters are mono-esters of sorbitol or sorbitan, e.g. sorbitan monolaurate, sorbitan monostearate or sorbitan monopalmitate.

The preferred amount of carboxylic acid ester 0.2 to 1.0 wt.%, based on the combined weights of ethylene copolymer and hydrocarbon resin and/or polybutylene or polyisobutylene.

After mixing the constituents of the composition of the invention the desired stretch and seal film can be made either by tubular blowing or by chill roll casting. In the tubular blowing method the composition in the molten state is forced around a mandrel inside a die and extruded through the die opening as a tube. The tube whilst still in the melt state is expanded to a hollow cylinder of desired diameter by blowing with the air admitted through the centre of the mandrel. Alternatively the extruded tube can be cooled by a water bath system wherein the extruded tube is cooled by passing it through a water bath containing flowing water. The chill roll casting method results in a more tacky, more elastic film with better visual appearance. In the chill roll casting method the hot melt extruded through a die slot is cooled by the surface of two or more water-cooled chill rolls.

Films having thicknesses of between 10 and 100 microns are preferred. If desired the films can be coloured provided they remain transparent.

It has been found that the presence of a partial carboxylic acid ester of a polyol, in particular sorbitan monolaurate and sorbitan mono-palmitate, improves the following properties of the film.

1. Antifog:

a normal polyolefin film covering food or a moist product will become covered with a layer of opaque-fine droplets when placed in a refrigerator normally at a temperature of 3°-8°C. This is a great disadvantage to the use of such films for wrapping food as it prevents the buyer, e.g. in a supermarket, being able to see the food easily. It is also clearly an advantage in the home if the wrapped food can be seen clearly.

2. Roll wind-off:

during use or further processing operations, such as slitting and re-winding of large rolls, it is important that the film can be unwound easily from the roll. If the additive makes it more difficult to unwind the film this is a great disadvantage.

3. Plate out:

the additives normally used for antifogging should act on the surface of the film and are therefore normally chosen to be only partly compatible with the film substrate. There is usually partial migration of the additive to the surface of the film where they can be most effective, but if the layer which is formed is hazy, the appearance of the film is spoilt, and in the worst examples the film is quite unsuitable.

4. Tack:

some additives which result in improved anti-fog properties unfortunately spoil the tack or cling of the film, but others improve the tack.

EXAMPLE

A blend was prepared of:
96.2 wt.% of a copolymer of ethylene and vinyl acetate containing 95 wt.% of ethylene.
3 wt.% hydrogenated polycyclopentadiene resin, and
0.8 wt.% sorbitan monolaurate The blend was extruded in a single screw extruder at 170°C forming strands which were water cooled and then cut into pellets.

The pellets were used to blow films in air using the following conditions:
Extruder screw length = 24:1 length to diameter ratio
Extruder screw compression = ratio 3.5:1
Extruder barrel temperature profile = 170°/200°/230°C
Die temperature = 220°-225°C
Blow up ratio = 2/1 or more
Thickness = 12–20 microns Other blends were prepared and extruded by the same method using 0.8 wt.% of other partial esters. The results obtained were as follows:

| Additive | Tack | Plate Out | Wind Off | Anti-fog |
|---|---|---|---|---|
| Sorbitan monolaurate | Excellent | Good | Fair | Excellent |
| Sorbitan monopalmitate | Good | Good | Good | Good |
| Polyethylene glycerol mono ricinoleate | Excellent | Very Poor | Very Poor | Very Poor |
| Glycerol mono oleate | Excellent | Fair | Fair | Excellent |
| Sorbitan mono oleate | Good | Good | Fair | Good |
| Glycerol monoricinoleate | Good | Good | Poor | Fair |
| Polyethylene monoricinoleate | Fair | Good | Poor | Very Poor |
| Octyl Phenoxy Ethanol | Poor | Poor | Good | Excellent |
| Polyoxyethylene Sorbitan Monostearate | Very Poor | Very Good | Very Good | Poor |
| Polyoxyethylene Sorbitan Stearate | Very Poor | Good | Very Good | Very Poor |
| Polyoxyethylene Sorbitan Monolaurate | No Tack | Hazy Incompatible | Excellent | Poor |

As can be seen, films prepared with partial fatty acid esters of polyols give satisfactory results.

It has also been found possible to improve some of the partial fatty acid ester results by regulating the processing conditions. In fact the various additives have different moleclular weights and their migration properties usually depend on the temperature at which the compositions are extruded when making the films.

What is claimed is:

1. A composition suitable for fabricating into a self-sealing film comprising (i) 90–99.95 wt. % of a copolymer of ethylene and a vinyl (or hdyrocarbyl substituted vinyl) ester of a $C_1$-$C_{30}$ monocarboxylic acid, (ii) either 0.05 to 10 wt. % of a hydrocarbon resin selected from the group consisting of a polyterpene and a polymerization product of a petroleum distillate fraction, or 0.05 to 5 wt. % of the hydrocarbon resin and 0.05 to 5 wt. % of polybutylene or polyisobutylene, provided the combined weight of the hydrocarbon resin and polybutylene or polyisobutylene is not more than 10 wt. % and (iii) 0.01 to 3.0% by weight based on the combined weight of (i) and (ii) of a partial carboxylic acid ester of a polyol wherein said ester is derived from a $C_{10}$-$C_{24}$ carboxylic acid and wherein said ester contains at least one unesterified hydroxyl group.

2. A composition according to claim 1 wherein the vinyl ester from which the copolymer is derived is vinyl acetate.

3. A composition according to claim 2 wherein the ethylene copolymer has a melt index (as defined in ISO.R292) of 1.5 to 3.0.

4. A composition according to claim 3 wherein the cracked petroleum distillate fraction has been hydrogenated.

5. A composition according to claim 4 wherein said fraction comprises compounds having one or more unsaturated rings in the molecule.

6. A composition according to claim 1 wherein the hydrocarbon resin has a Gardner colour of 1 to 3, and a bromine number of 1 to 20.

7. A composition according to claim 4 wherein the resin is hydrogenated polycyclopentadiene resin.

8. A composition according to claim 1 wherein the polyisobutylene has a viscosity average MW (Flory) of 30,000 to 50,000.

9. A composition according to claim 1 which comprises 96 to 99 wt.% of the ethylene copolymer and 1 to 4 wt.% of the hydrocarbon resin, polyisobutylene or polybutylene.

10. A composition according to claim 1 which comprises 92 to 96 wt.% of ethylene copolymer and 3 to 6 wt.% of hydrocarbon resin plus 1 to 2 wt.% of polyisobutylene or polybutylene.

11. A composition according to claim 9 wherein the ethylene copolymer contains from 85–97wt.% of ethylene.

12. A composition according to claim 11 wherein the content of ethylene is 91 to 95wt.%.

13. A composition according to claim 1 wherein the partial carboxylic acid ester is derived from a (monobasic) fatty acid.

14. A composition according to claim 13 wherein only one of the hydroxyl groups of the polyol from which the partial carboxylic acid ester is derived is esterified.

15. A composition according to claim 13 wherein the carboxylic acid from which the ester is derived is saturated.

16. A composition according to claim 9 wherein the ester is a saturated fatty acid ester of sorbitol.

17. A composition according to claim 16 wherein the fatty acid is a $C_{10}$ to $C_{20}$ fatty acid.

18. A composition according to claim 10 wherein the partial carboxylic acid ester is sorbitan monolaurate or sorbitan monopalmitate.

19. A composition according to claim 16 wherein the amount of fatty acid ester is 0.2 to 1.0 wt.% based on the combined weights of ethylene copolymer and hydrocarbon resin and/or polybutylene or polyisobutylene.

20. A film prepared from a composition according to claim 16.

21. A film according to claim 20 which has a thickness of between 9 and 100 microns.

* * * * *